Patented Apr. 2, 1929.

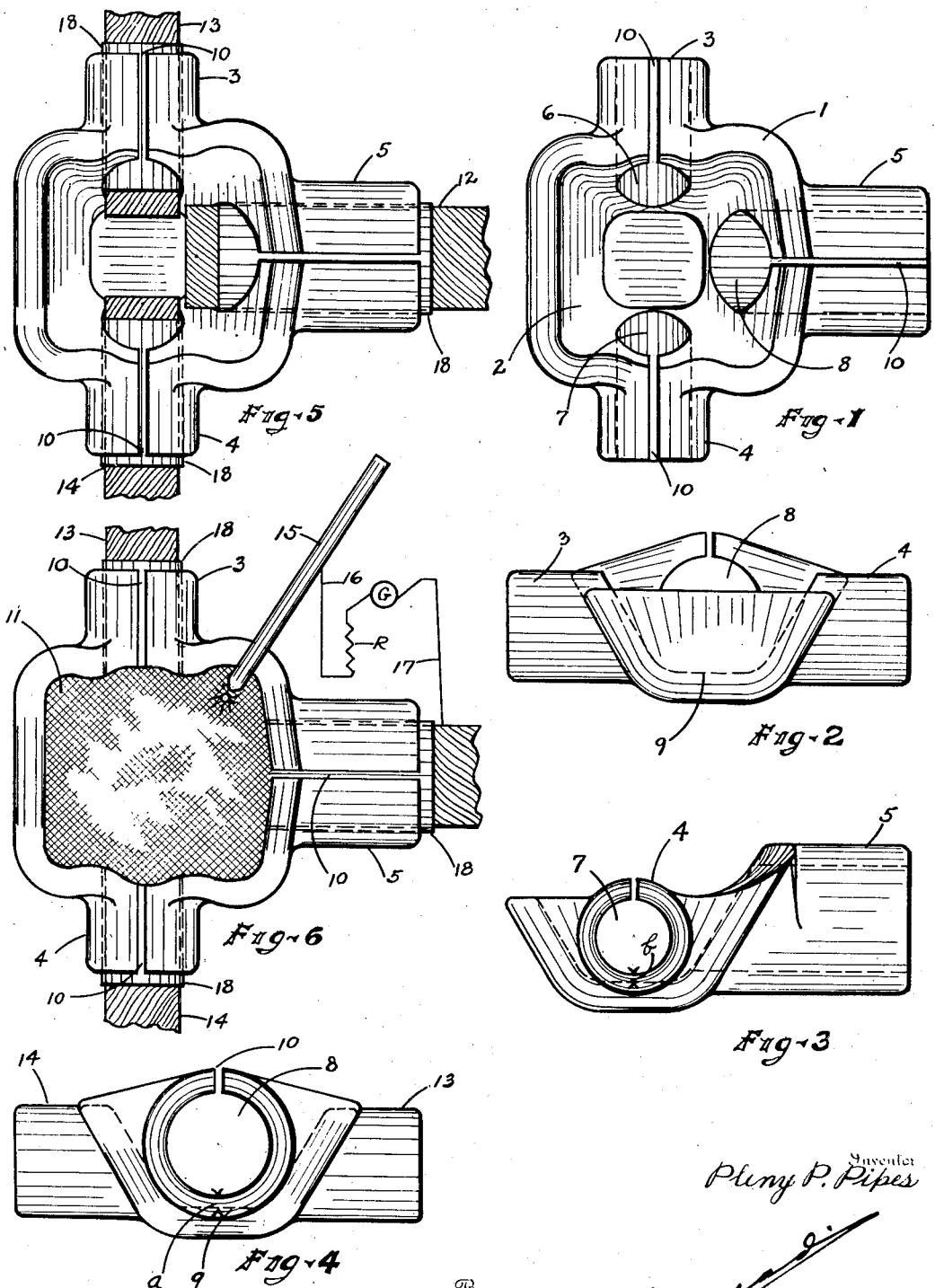

1,707,317

UNITED STATES PATENT OFFICE.

PLINY P. PIPES, OF MANSFIELD, OHIO, ASSIGNOR TO THE OHIO BRASS COMPANY, OF MANSFIELD, OHIO, A CORPORATION OF NEW JERSEY.

APPARATUS FOR AND METHOD OF CONNECTING CABLES.

Application filed September 24, 1926. Serial No. 137,476.

My invention relates to a method of connecting cables by welding and the apparatus or device used in connection with the method.

The object of my invention is to provide a device and method for connecting cables to each other, especially electric cables and which may be of varying sizes, and make such connections through the medium of welding, and which will provide a highly efficient joint, both mechanically and electrically.

My invention resides in the new and novel construction, combination and relation of the parts herein disclosed and the various steps involved in the process.

In the drawing:

Fig. 1 is a top view of a device which I employ.

Fig. 2 is one end view.

Fig. 3 is a side view.

Fig. 4 is an end view of Fig. 1, but opposite to that of Fig. 2.

Fig. 5 shows the device with cables or conductors positioned therein.

Fig. 6 shows the joint completely made and also shows an electrode by means of which the welding of the joint is carried out. The electrode and source of energy for supplying current for the welding operation is shown schematic.

In the preferred embodiment of my invention I employ a body member 1 having formed therein a receptacle 2. The shape of the body member may be varied to suit requirements, as for instance, it may be circular instead of square, as shown, or it may be elliptical or rectangular. The body member 1 and receptacle 2 form a cup shaped device which is capable of catching, supporting and retaining fused welding metal.

Projecting from the side walls of the member 1 are tubular shaped bosses 3, 4 and 5. The passages 6, 7 and 8 through the projections terminate within the receptacle 2. The tubular shaped projections may be of variable sizes and lengths to accommodate themselves to varying sizes of cables or conductors.

The bottom edge of each passage is shown as raised above the bottom interior surface of the member 1, as for instance, the lower surface of the passage 8 is the distance $a$ above the lower face 9 of the body member 1, and this difference in height provides a space between the cable and the bottom face 9 of the receptacle and permits the welding metal to flow therein. The difference in the case of the passages 6 and 7 is indicated by $b$ on Fig. 3.

The tubular projections are provided with slots 10 by means of which the tubular member is made to give a closer fit to the cable as this slot permits the insertion of a wedge-shaped tool therein to spread and enlarge the passage, which permits the tubular member to securely engage the cable when the wedge is removed if the passage through the tubular member has been made close to or slightly less than the diameter of the cable.

The device is preferably made of a ferrous metal such as iron or steel and may be either cast, forged or formed out of sheet metal. The device, however, can be made of copper or any of the numerous copper mixtures.

I prefer the use of iron or steel for the reason that the cables are usually of copper and the welding metal 11 is preferably of copper or copper alloy, and I find that copper or copper alloy will make a much stronger joint or fused union with iron and steel than it will with copper.

Having the cables snugly held in the tubular projections 3, 4 and 5, there will be no relative movement of the cable with respect to the device, therefore, there will be no strain upon the joint between the welding metal and the cable, and since the welding metal is securely welded to the interior walls of the receptacle 2 it will be evident that a joint will be produced which will be permanent as all parts are securely welded together and the joint between the cable and welding metal reinforced by the tubular projections 3, 4 or 5. By making the device with a receptacle sufficiently large the amount of metal connecting the conductors will be sufficient to produce a joint of very low resistance, and I prefer to depend upon the copper or copper alloy welding metal almost entirely for the conducting feature of the joint and not upon the member 1, although it adds materially to the conductivity of the entire joint.

As stated before, the member 1 can be made of copper or copper alloy, but the fused attaching or welding metal does not make as strong a union therewith as it does in the case of iron or steel. I find that if made of a casting that malleableized cast iron is very suitable metal for such purposes.

In Fig. 5 the cables 12, 13 and 14 to be connected are shown in position. If desired, the cable 13 or 14 might be made continuous if not too long to conveniently pass through the passages 6 and 7.

To protect the cables from injury by the members 3, 4 and 5, I employ a sleeve 18 which projects within and without the receptacle 2 and made preferably of relatively thin copper.

To electrically unite the ends of the cables after being positioned in place, I use the oxy-acetylene flame or the electric arc and in the latter case the welding may be done by either the carbon arc or metal electrode process, both methods being very old and well known.

In Fig. 6 I have shown the joint as completed with an electrode 15 in position and having connected thereto the conductor 16 from the generator G and having in series a resistance R. The opposite end of the generator G is connected to the cable or device by means of the conductor 17. If a metal electrode is used the end of its is touched to the interior portion of the member 1 or to the cables therein and then withdrawn to form an arc. This arc will fuse the surface of the part to which it is applied and also the end of the electrode 15 and the fused end of the electrode will drop and deposit upon the fused spot referred to and unite therewith. When this takes place the arc is moved to an adjacent spot and the drop of fused electrode deposited and then the electrode is moved to another adjacent spot and these steps repeated until the interior of the receptacle 2 is filled with the welding metal, which is fused to the interior surface of the receptacle 2 and to the surface of the conductor therein.

If a carbon electrode is used the arc is formed between the carbon and the part to be fused and the attaching metal is in the form of a separate rod and the end of this rod is inserted in the arc and melted and deposited upon the fused spot. The oxy-acetylene process is old and well known and can also be used in a manner similar to the carbon arc in which the parts are heated by means of the oxy-acetylene flame and the welding metal added in the form of a rod.

There are no doubt many modifications which can be made in my invention and in the process, but I am not aware of a device of the character described, in which the same is cast or formed up out of a ferrous metal and having an open receptacle in which is deposited fused metal which is simultaneously fused to the interior surface of the device, the surface of the cables, the inner end of the sleeve and in which the cables are firmly gripped and held against relative movement with respect to each other or to the device.

While I have shown the member 1 of quite thick metal it can be made out of very thin sheet steel or iron if desired, but it, of course, must be heavy enough to withstand the heat of the arc or flame.

Having described my invention, I claim:

1. A cable connector comprising a cup-shaped receptacle member with one or more tubular projections extending exterior thereof from the side walls and opening within the receptacle, the lower faces of the interior of the tubular member or members being raised relative to the interior bottom surface of the receptacle and a longitudinal slot in each tubular member to permit its yielding.

2. A cable connector comprising a cup-shaped receptacle member with one or more tubular projections extending exterior thereof from the side walls and opening within the receptacle, the lower faces of the interior of the tubular member or members being raised relative to the interior bottom surface of the receptacle and a longitudinal slot in each tubular member to permit its yielding, a cable positioned within each tubular projection and having adjacent ends within the receptacle and metal fused to the adjacent ends of the cable and to the interior surface of the receptacle to unite the parts each to the other.

3. The method of making a joint comprising the steps of forming a cup-shaped receptacle member having one or more tubular projections from the sides, then positioning a cable within each projection and bringing the ends adjacent within the receptacle, then fusing the inner surface of the receptacle and the faces of the cable within the receptacle by means of the electric arc and dropping fused metal upon the fused parts, as fused, and adding fused metal to the alreay deposited metal until the receptacle is filled and the parts united to each other through the medium of the fused metal.

4. A cable connector comprising a cup-shaped receptacle member of ferrous metal with one or more exterior tubular projections from the walls thereof and longitudinal slots in the tubular projections to permit them to yield to vary the size of the passage therethrough and grip a conductor.

5. A connection comprising a plurality of conductors in juxtaposition and angularly disposed to each other, means adapted to engage each conductor and provided with means forming a receptacle adjacent the conductors and means fused to the conductors and to the interior surface of the receptacle to integrally unite the parts together.

6. A connector comprising tubular members, the tubular members arranged to hold cables in a fixed position, a protecting sleeve interposed between and engaging with each tubular member and the cable and projecting from the tubular members exterior thereof, means to secure the tubular members together and form a receptacle to catch, support and retain fused welding metal in contact with the said means and the cable to unite the said means, cable and sleeve together.

7. A cable connector comprising tubular members, means to secure the tubular members together, each tubular member arranged to hold a cable in a fixed position, means forming a receptacle with the first said means, a sleeve interposed between the tubular member and the cable and projecting within the receptacle, the receptacle adapted to catch, and retain fused welding metal in contact with the said means, the cable and the sleeve to unite the parts each to the other.

8. The method of making a joint comprising the steps of forming a cup-shaped receptacle member having one or more tubular projections from the sides, then positioning a cable within each projection and bringing the ends adjacent within the receptacle, then fusing the inner surface of the receptacle and the faces of the cable within the receptacle by means of a heating flame and dropping fused metal upon the fused parts, as fused, and adding fused metal to the already deposited metal until the receptacle is filled and the parts united to each other through the medium of the fused metal.

9. The method of joining cables comprising the step of forming a cup-shaped metallic receptacle member having means to hold the adjacent cable ends in juxtaposition, then positioning the ends of the cables in juxtaposition and projecting within the receptacle, then applying a fusing heat to the ends of the cables within the receptacle to fuse them and to the interior surface of the receptacle member to fuse it and simultaneously adding to the said fused parts a metal in a fused state of substantially the same properties as that of the cables until the receptacle is substantially filled and then electrically and mechanically uniting the cables to each other and to the receptacle member.

10. The method of joining two or more cable ends comprising positioning the cable ends adjacent to each other within a metallic receptacle, then applying a fusing heat to the cable ends and to the inner surface of the metallic receptacle to fuse such ends and surface and then melting by said heat copper from a separate source and permitting the fused copper to unite with the fused cable ends and fused surface of the receptacle and unite the cables and metallic receptacle each to the other.

In testimony whereof I affix my signature.

PLINY P. PIPES.